United States Patent [19]

Williams et al.

[11] Patent Number: 4,652,596
[45] Date of Patent: Mar. 24, 1987

[54] THERMOSETTING RESIN CASTING PROCESS, PRODUCT AND DEVICE

[75] Inventors: Robert D. Williams, Bangor; Bud G. Struble, East Bangor, both of Pa.

[73] Assignee: Formica Corporation, Wayne, N.J.

[21] Appl. No.: 773,580

[22] Filed: Sep. 9, 1985

[51] Int. Cl.$^4$ .............................................. C08J 3/00
[52] U.S. Cl. ................................. 523/348; 523/347; 523/500
[58] Field of Search .................... 523/347, 348, 500
[56] References Cited
U.S. PATENT DOCUMENTS 3,633,880 1/1972 Newmark ........................... 259/191
4,473,673 9/1984 Williams et al. .................... 523/319

*Primary Examiner*—Melvyn I. Marquis
*Attorney, Agent, or Firm*—Robert W. Fieseler; Donald A. Peterson; Michael O. Warnecke

[57] ABSTRACT

A process for producing cast unsaturated thermosetting resins which are highly stain resistant is disclosed. A pressurization step is applied to the thermosetting resin prior to casting to reincorporate any volatilized monomer which has volatilized during a previous deaeration step. The resultant casting is non-porous in cross-section which produces a product which is both stain resistant and machinable in the field without exposing voids.

44 Claims, 8 Drawing Figures

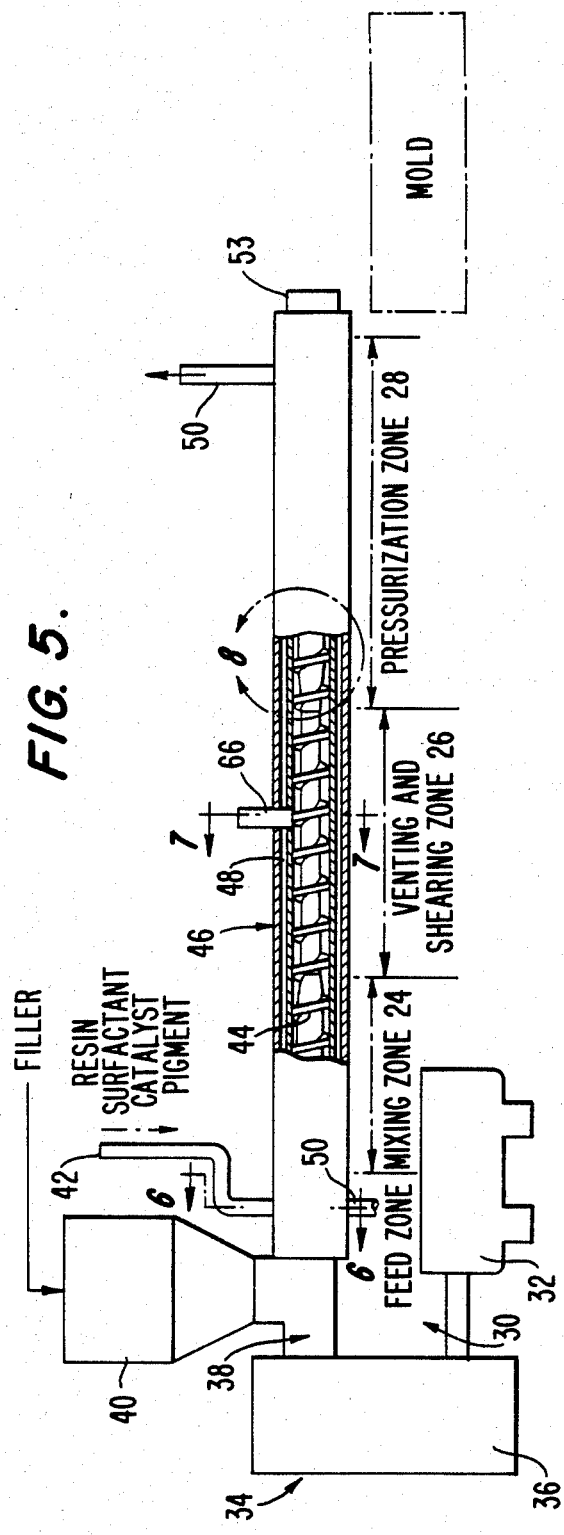
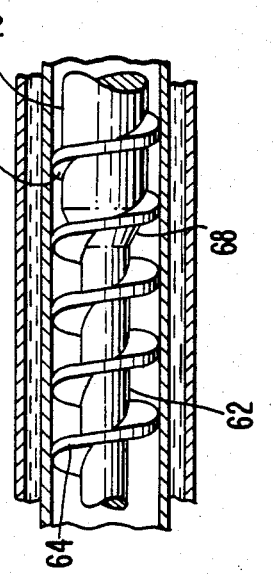
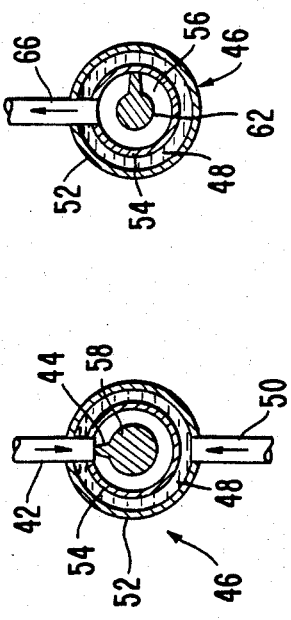

THERMOSETTING RESIN CASTING PROCESS, PRODUCT AND DEVICE

BACKGROUND OF THE INVENTION

The invention relates to processes for casting dense and highly stain resistant unsaturated thermosetting resins and, more particularly, to processes for casting filled unsaturated thermosetting resins to produce simulated stone such as synthetic marble and onyx and the dense stain resistant products made therefrom. Furthermore, the invention relates to a process for the continuous casting of unsaturated thermosetting resins to produce dense and stain resistant products and equipment for performing the continuous process. The invention also relates to products made by these processes.

DESCRIPTION OF THE PRIOR ART

U.S. Pat. No. 4,473,673, which is incorporated herein by reference in its entirety, discloses a process for the mixing and casting of a thermosetting resin which produces dense and highly stain resistant products. The resins disclosed therein may be filled to produce a synthetic marble or other synthetic stone products.

The assignee of U.S. Pat. No. 4,473,673 produces a product marketed under the trademark QUINTESSA® which is covered by U.S. Pat. No. 4,473,673. This product utilizes an unsaturated polyester resin which is cross-linked with styrene monomer and which is filled with alumina trihydrate.

This product is made by a batch process which includes a final step of vibrating the deaerated matrix to reincorporate monomer volatilized in a preceding deaerating step of simultaneously applied vacuum, shearing and vibration. This final step of vibration produces a dense and highly stain resistant product which is void free and therefore capable of being cut, sanded, shaped and otherwise machined in much the same manner as wood.

While the aforementioned process produces a material of commercially acceptable quality, it suffers the inherent disadvantages of any batch process as compared to a continuous process. Higher production rates are more difficult to achieve, consistent quality is harder to maintain and manufacturing costs are higher.

In the production of QUINTESSA® several parameters have been found to be important in determining the economy of the process and the quality of products. With respect to the aforementioned reincorporation of volatilized monomer, the following parameters are significant: (1) the apparent viscosity of the mix; (2) the time and amplitude of vibration; and (3) temperature of the mix. It has also been established that a relationship exists between resin viscosity and physical composition of the filler which determines the degree of stratification, i.e. the setting of filler and upward displacement of resin during vibration. This stratification induces warping and internal stresses and has a pronounced effect on the quality of material produced.

SUMMARY OF THE INVENTION

The present invention is an improvement of the process disclosed in U.S. Pat. No. 4,473,673 and produces a product of at least comparable stain resistance to the product disclosed therein. Moreover, the present invention may be practiced as a continuous process or a batch process. Furthermore, the invention is a dense and highly stain resistant product produced by the process disclosed herein. Finally, the invention is an apparatus for implementing the continuous process disclosed herein.

The process of the present invention is an improvement over the batch process disclosed in U.S. Pat. No. 4,473,673 by reincorporating volatilized monomer with a pressurization step which may be implemented in the same apparatus used for performing the prior process steps of evacuating, shearing and vibrating. All the process steps prior to reincorporation of volatilized monomer are identical to those described in U.S. Pat. No. 4,473,673. The replacement of the final vibration step by a pressurization step to reincorporate volatilized monomer permits the use of a wider range of resin viscosities and filler compositions without incurring stratification and the attendant warping and internal stresses in the product. This in turn makes possible (1) the use of more economical combinations of resin and filler and (2) the manufacture of other products not possible with the use only of vibration.

The process of the present invention is implementable in a continuous system which permits a more efficient manufacturing operation than is possible with using the batch process. The entire sequence of processing steps, i.e. mixing, deaeration and reincorporation of volatilized monomer, before casting may be implemented in a device having separate mixing, deaeration and compression zones which eliminates the requirement for separate processing equipment as described in U.S. Pat. No. 4,473,673. While the mixing, deaeration and compression zones are preferably implemented with a single barrel and screw, the invention may utilize separate screws and barrels each separately driven.

A process for producing a castable unsaturated thermosetting resin further in accordance with the invention includes the steps of formulating a mixture of liquid thermosetting resin, including cross-linking monomer, and catalyst to form a uniform blend; subjecting the blend to a vacuum of a predetermined time and magnitude while concurrently shearing the blend to deaerate the uniform blend of entrapped air bubbles; and subjecting the blend after the completion of the applied vacuum and shearing step to a pressurization at a pressure above atmospheric pressure for a time sufficient to cause reincorporation of monomer volatilized during the vacuum and shearing step to form a matrix capable of setting and curing to dense and stain resistant castings. The pressurization may be set to approximately at least 1.7 atmospheres for a period of at least five minutes to produce detectable densification of the blend by reincorporation of the monomer volatilized during the previous step of application of vacuum and shearing. Higher pressures expedite the reincorporation of volatilized monomer and may produce a more densified product than otherwise possible. To expedite the completion of the reincorporation of volatilized monomer, vibration may also be applied to the blend. Maintaining the temperature in a controlled elevated range such as between 80° to 110° expedites the reincorporation of volatilized monomer. The blend of thermosetting resin, cross-linking monomer and catalyst may be filled with suitable known fillers having a wide range of sizes including, but not limited to, particles of a size range which remain in a uniform suspension if the blend is subjected to vibration sufficient to cause reincorporation of volatilized monomer as disclosed in U.S. Pat. No. 4,473,673.

A continuous process for producing a castable thermosetting resin further in accordance with the present invention is performed within an apparatus having a mixing zone for mixing the resin to form a uniform blend which is connected to a deaeration zone for deaerating the blend which is connected to a pressurization zone for pressurizing the blend to reincorporate volatilized monomer back into the blend. The process in the apparatus described, supra, includes the steps of formulating a mixture of the liquid unsaturated thermosetting resin including at least a cross-linking monomer and catalyst to form a uniform blend within the mixing zone while the blend is transported through the mixing zone; transporting the uniform blend to the deaeration zone where vacuum and shearing is applied to the blend of a magnitude sufficient to deaerate the blend of entrapped air bubbles while the blend is transported through the deaeration zone and transporting the deaerated blend to the pressurization zone where pressurization is applied to the deaerated blend while passing through the pressurization zone of a magnitude sufficient to cause reincorporation of monomer volatilized during processing in the deaeration zone to form a matrix capable of setting and curing to form a dense and stain resistant casting.

A further process in accordance with the invention for producing a castable unsaturated thermosetting resin within a mixing apparatus having a mixing zone for mixing the resin to form a uniform blend which is continuously transported during mixing to a connected deaeration zone for deaerating the blend includes the steps of formulating a mixture of liquid unsaturated thermosetting resin including cross-linking monomer and catalyst to form a blend while being transported through the mixing zone; subjecting the blend to a vacuum of a predetermined time and magnitude while concurrently shearing the blend of entrapped air bubbles while being transported through the deaerating zone; and subjecting the deaerated blend to vibration for a time sufficient to cause reincorporation of monomer volatilized during the vacuum and shearing step to form a matrix capable of setting and curing in a non-porous machinable casting. Alternatively, the mixing apparatus within which this process is performed may perform mixing and deaeration within the same zone.

BRIEF DESCRIPTION OF THE DRAWINGS

FIG. 5 illustrates a suitable device for implementing the process illustrated in FIG. 3.

FIG. 6 is a sectional view along section line 6—6 of FIG. 5.

FIG. 7 is a sectional view along section line 7—7 of FIG. 5.

FIG. 8 is an expanded view within circle 8 of FIG. 5.

DESCRIPTION OF THE PREFERRED EMBODIMENTS

Figure 1:
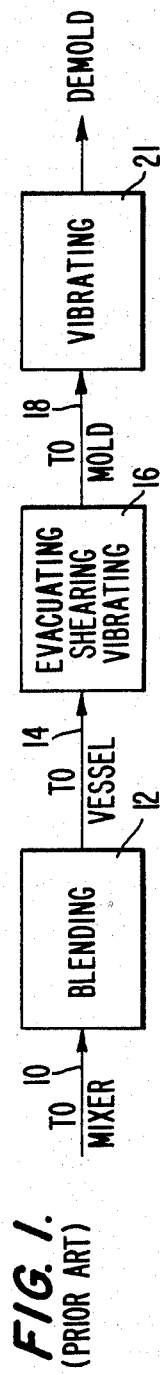
FIG. 1 illustrates the prior art process disclosed in U.S. Pat. No. 4,473,673.

FIG. 1 illustrates a block diagram of the prior art process disclosed in U.S. Pat. No. 4,473,673. In the first block 12, a uniformly mixed blend of unsaturated thermosetting resin, cross-linking monomer, catalyst and other additives is prepared. At point 14, the uniformly prepared blend is transferred to a vessel where at point 16 simultaneously vacuum, shearing and vibration is applied to the blend contained in the vessel. The purpose of the process at point 16 is to deaerate the blend of air bubbles which are entrapped in the blend. At point 18 the deaerated blend is transferred to a container such as a mold where vibration is applied to the blend contained therein. In U.S. Pat. No. 4,473,673 it is disclosed that the application of a vacuum to the blend at point 16 causes the volatilization of monomer coincident with the degassing of air. Without a subsequent step to remove the volatilized monomer, the resultant cast product will have an unacceptable amount of voids or porosity caused by the curing of the resin without the reincorporation of the volatilized monomer which lessens stain resistance in the cross-section.

The present invention is an improvement of the process of FIG. 1 by replacing the vibration step illustrated at point 21 with a pressurization step which also performs the function of reincorporation of any monomer or other component volatilized at point 16. The replacement of the vibration step 21 with a pressurization step has advantages. In the first place, the pressurization step may be performed in a batch process in the same vessel used for the evacuating, shearing and vibrating step 16. Secondly, pressurization improves the versatility of the process by extending the range of fillers and resins that may be used. As described previously, vibration limits the maximum size range of the filler particles and the viscosity of the resin which may be used without stratification occurring. Stratification of filler causes warping and internal stresses which does not occur when pressurization is used to reincorporate monomer and other volatilized components.

Thirdly manufacturing costs are lower in that more economical combinations of resin and filler are possible where vibration and the tendency toward stratification are absent. Finally, pressurization permits the reincorporation of volatilized monomer or other components to proceed more rapidly and correspondingly the process to be carried out more quickly. This in turn has readily apparent economic benefits.

Figure 2:
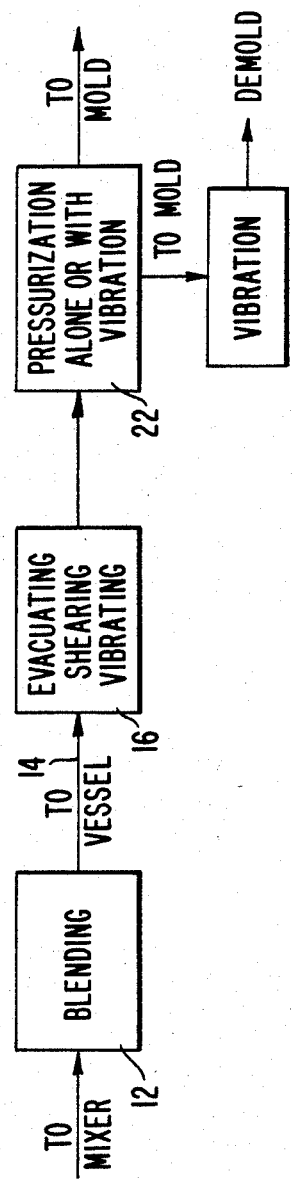
FIG. 2 illustrates an improvement of the prior art process of FIG. 1.

FIG. 2 illustrates a sequence of steps in a batch process in accordance with the present invention which is an improvement of the process of FIG. 1. The same reference numerals are used in FIG. 2 to identify steps common to FIG. 1. The pressurization step 22 is a direct replacement for the vibration step 21 of FIG. 1. As illustrated at step 22, pressurization may be used alone or in combination with vibration to cause a reincorporation of volatiles into the blend. The pressurization step may be implemented in the same vessel used for the simultaneous evacuation, shearing and vibration step 16. If vibration is also to be used to expedite devolatilization in combination with pressurization, it can most easily be applied after pressurization by the application of the vibrations to molds used for casting product. However, the combination of vibration and pressurization may be performed either concurrently or sequentially.

The purpose of the pressurization step 22 is to force volatilized components back into solution in order to eliminate those voids in the final product caused by the presence of volatiles at the time of cure or hardening of the matrix. In practical terms, it is necessary to apply a pressure above atmospheric pressure for a time sufficient to cause reincorporation of components volatilized during the evacuating, shearing and vibrating step 16. It is highly desirable to perform the reincorporation of volatiles in the fastest possible time to increase the efficiency of the process. In experiments run with unsaturated polyester resin having styrene monomer as a cross-linking agent, a pressure of approximately 1.7 atmospheres and a time of 5 minutes were found to be the minimal conditions at which a detectable reduction in porosity occurred. As pressure is increased, the porosity of the product is further reduced until the resultant product is at least as dense (stain resistant) as the product produced by the process of FIG. 1. Similarly, as the time of application of pressure is increased, porosity of the final product continues to diminish.

Studies have shown that the porosity of the product, as illustrated by electron photomicrographs, is not further diminished by using either pressure alone or in combination with vibration. Thus, the substitution of a pressurization step 22 is a complete replacement for the vibration step 21 of FIG. 1. Increased presures may result in the achievement of a maximum density not possible by utilization of only the vibration step 21 of FIG. 1.

Figure 3:
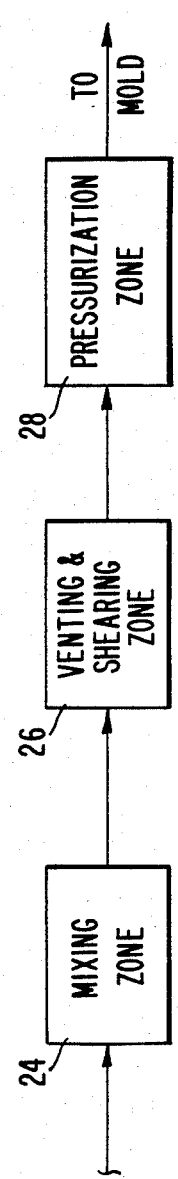
FIG. 3 illustrates a continuous process in accordance with the present invention.

FIG. 3 illustrates the sequence of steps for implementing the invention in a continuous process in an apparatus such as a barrel containing a rotating screw similar in design to an extruder typically employed for the extrusion of thermoplastic materials.

The barrel and screw contains three principal zones. The first zone is the mixing zone 24 in which blending of the components takes place. These components are the same as those mixed at the blending step 21 of FIGS. 1 and 2. Typically when mixing an unsaturated polyester resin, the constituents will include the resin containing a cross-linking monomer, a catalyst, a surfactant and a filler such as alumina trihydrate or calcium carbonate, but not limited to these fillers. The second principal zone 26 is for venting or deaeration where entrapped air is removed by the simultaneous application of shearing and venting to the atmosphere without applied vacuum or with applied vacuum. The degree of venting or vacuum necessary is determined empirically for the materials being used. The function of this section is identical to the evacuating, shearing and vibrating step 16 of FIGS. 1 and 2. However, unlike the batch process where vibration is necessary to facilitate migration of the air to the surface of the mix, the continuous process requires no vibration because of the more intensive shearing and the higher surface to volume ratio that is feasible. These two factors also make possible the removal of air in a shorter residence time than is possible in the batch process. The vacuum required is a function of the temperature at which the system is operated as well as the physical design and efficiency of this particular section. A vacuum in excess of 15 inches probably will be required. The third zone 28 pressurizes the mix to dissolve or reincorporate all volatiles resulting from the deaeration stage 26. The higher the pressure, the lower the residence time that is required to achieve the same degree of reincorporation. In a continuous process where the time of exposure to pressure will be less than in the batch process, a significantly higher pressure will be necessary to achieve the same densification. A screw designed to achieve the requisite pressurization is an implementation which may be readily used in a commercial process but the process is not limited thereto.

The processing zones 24, 26 and 28 of FIG. 3 may be implemented in a single barrel containing a rotating screw comprised of several sections, each of which contains flights designed to perform specific functions. In the mixing zone 24, the screw contains flights specifically designed in accordance with accepted and well-known design principles to induce intensive and thorough mixing of the components to produce a homogeneous blend. The homogeneous blend is continuously transported from the mixing zone to the vented zone 26 where intensive shearing takes place within deep flights, thus exposing and rupturing entrapped air bubbles which are aspirated away thru a vent designed in accordance with well known and accepted principles as practiced in the extrusion of thermoplastics. In this section the residence time, the intensity of shear and the vacuum employed are all interrelated. The pressurization zone 28 contains shallow flights to increase the pressure on the mix by reducing the cross-sectional area of flow. The amount of volatilized material in the mix entering the pressurization zone is a function of the conditions prevailing in the vented zone 26. Therefore, it is necessary that the pressurization zone be designed with adequate residence time and capability for pressures that will enable reincorporation of volatiles at all reasonable conditions under which the vented section will be operated. In addition to those conditions, parameters effecting the functioning of this zone are primarily temperature and apparent viscosity of the mix.

Figure 4:
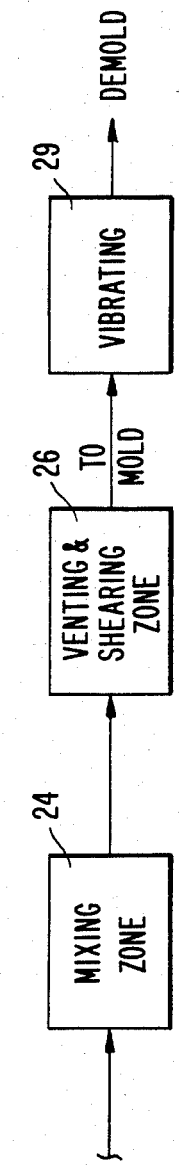
FIG. 4 illustrates a process in accordance with the invention which uses continuous mixing and deaeration in combination with vibration to reincorporate volatilized monomer.

FIG. 4 illustrates a modification of the process of FIG. 3. Like reference numerals identify like steps in FIGS. 3 and 4. The difference between FIG. 4 and FIG. 3 is that in FIG. 4 vibration is used to reincorporate monomer volatilized at the venting and shearing zone 26 instead of a pressurization zone 28 as in FIG. 3. The vibration is applied after the deaerated blend produced by step 26 has been placed in a container such as the mold used to form the cast product.

FIG. 5 illustrates one form of an apparatus in accordance with the invention for implementing the continuous process. The apparatus of FIG. 5 has four principal zones which are the feed zone 30, and the previously described serial mixing zone 24, vented zone 26 and pressurization zone 28. A motor 32 drives a gear train 36 which is connected to the worm 38. The choice of the motor 32 and the design of the gear train 36 ar matters of conventional expedience which will not be described herein. A hopper 40 is provided thru which suitable fillers, such as alumina trihydrate or limestone, are added to achieve a desired degree of filling in the resultant cast product. The choice of the particular filler is determined by the type of desired product including physical characteristics and economics. Port 42 is used for adding resin, surfactant, catalyst, pigment and other additives which may be necessary to make the resultant cast product. Port 42 may be either a single port as illustrated or it may be multiple ports depending on the feasibility of introducing individually or in combination the several components. The details of the cross-section 6—6 through the port 42 are illustrated in FIG. 6 as described, infra. The flights 44 of the worm 38 in the mixing zone 24 are designed to perform uniform blending of the ingredients added in the feed zone 30 by the time the blend passes into the vented zone 26.

The barrel 46 contains a jacket of circulating coolant 48 which is illustrated in the sectional views of FIGS. 6 and 7 described, infra. The function of the cooling jacket 48 is to maintain the desired processing temperatures for most effective reincorproation of volatiles and for controlling the rate of reaction. The detailed design of the cooling system including direction of flow of the coolant, sectionalizing of the jacket and the other features commonly known and practiced in the industry will be as required to maintain the requisite temperature profile along the barrel.

A nozzle 53 is attached to the barrel at the end of the pressurization zone 28 with a quick-disconnect mounting (not illustrated) to permit ready access for cleaning as is common practice with thermoset resins. The material which exits the nozzle is placed in molds for forming the desired cast products.

FIG. 6 illustrates a sectional view of the apparatus taken along section line 6—6. Coolant is circulated in the annulus 48 formed by concentric cylinders 52 and 54 which respectively define the exterior and the interior of the barrel. The port 42 communicates with the interior of the barrel 56 to permit the addition of resin, surfactant, catalyst, pigments and other additives as described above with regard to FIG. 5. Coolant 51 is introduced into and flows from the cooling jacket 48 thru fluid ports 50.

FIG. 7 illustrates a sectional view of the apparatus of FIG. 5 taken along section lines 7—7. The vent 66 communicates with the interior of the barrel 56 to permit the aspiration of air which has been freed by the shearing action of the flights 62. The design of the flights 44 in barrel 56 in the vented zone 26 may be in accordance with U.S. Pat. No. 3,633,880. It should be understood that the actual configuration of the vent 66 is not limited to the form illustrated.

FIG. 8 illustrates an expanded view of the apparatus of FIG. 5 at the transition zone 8 between the vented zone 26 and the pressurization zone 28. The diameter of the shaft varies smoothly between a smaller diameter 62 in the vented zone thru a smooth transition 68 to a larger diameter 70 within the pressurization zone 28. The increase in diameter of the shaft between the vented zone 26 and the pressurization zone 28 and a corresponding decrease in the depth of the flights from the deeper flights 64 to the shallower flights 72 causes pressurization of the blend to reincorporate residual components volatilized in the vented zone 26 during deaeration of the blend.

The diameters and configurations of the shaft 58, 62 and 70, respectively, in the mixing zone 24, vented zone 26 and pressurization zone 28 are determined empirically as a function of the unsaturated thermosetting resin being processed. However, in order to achieve sufficient pressurization for reincorporation of volatiles in the pressurization zone 28, it is necessary that the diameter of the shaft 70 be larger than the diameter of the shaft 62 in the vented zone 26 as illustrated in FIG. 8. A substantial pressurization of several atmospheres may be achieved in the pressurization zone 28 without excessive heating due to the cooling jacket 48. If higher pressures are found desirable, additional cooling may be obtained by using a hollow shaft and circulating coolant through it as well.

It should be further understood that the configuration and the slope of the flights in the respective zones may be varied from those as illustrated to accomplish the specific processing functions to be peformed therein. While the flight design in the venting and shearing zone 26 and the pressurization zone 28 may be in accordance with U.S. Pat. No. 3,633,880, it should be understood that other designs, as known in the art, may be utilized to achieve sequential deaeration and pressurization.

Furthermore, it should be understood that the design of the flights in the feed zone and mixing zone 24 may be in accordance with numerous designs known in the art.

EXAMPLE 1

After evacuation, the shearing and vibration are terminated. The vacuum is then released, the vessel opened and the mix transferred to open molds. Porosity in the cured product as determined by measuring resistance to staining is high. Visible voids are present, although they are considerably fewer (one per three square inches) if the temperature of the matrix is maintained at 85° F. during evacuation.

EXAMPLE 2

After evacuation, the shearing and vibration are terminated. The vacuum is released, the vessel opened and the mix transferred to open molds. The molds are vibrated for 20 minutes. Porosity in the cured product as determined by measuring resistance to staining is low. Visible voids are absent even when evacuation is carried out at temperatures as low as 70° F. Photomicrographs confirm low porosity.

EXAMPLE 3

After evacuation, shearing and vibration are terminated. The vacuum is then released. Pressure of 1.7 atmospheres absolute is applied for 10 minutes. At the conclusion of 10 minutes, pressure is released, the vessel is opened and the mix is transferred to the molds. Stain tests show porosity, although less than in Example 1.

EXAMPLE 4

After evacuation, shearing and vibration are terminated. The vacuum is then released. Pressure of 2.0 atmospheres absolute is applied for 5 minutes. After 5 minutes, pressure is released, the vessel is opened and the mix is transferred to the molds. Density (absence of porosity) in the cured product, as determined by resistance to staining, is superior to Example 1 but inferior to Example 2.

EXAMPLE 5

After evacuation, the shearing and vibration are terminated and the vacuum released. While still in the vacuum vessel, pressure of 2.0 atmospheres absolute is applied for 10 minutes after which the pressure is released, the vessel is opened and the mix is transferred to open molds. The density of the cured product as determined by resistance to staining is equal to that in Example 2.

EXAMPLE 6

After evacuation, the shearing and vibration are terminated and the vacuum released. While still in the vacuum vessel, pressure of 2.0 atmospheres absolute is applied for 5 minutes after which the pressure is released, the vessel is opened and the mix is transferred to open molds. The molds are then vibrated for 10 minutes. The density of the cured product as determined by measuring resistance to staining and by photomicrographs is comparable to that of Example 2.

It should be clearly understood that the present invention is applicable to all types of liquid unsaturated thermosetting resins which are subject to void formation on casting. Furthermore, it should be understood that variation of the resin base, viscosity, filler content, and the physical design of the batch processing equipment used to implement the process of FIG. 2 and the continuous processing equipment used to implement the processes of FIGS. 3 and 4 will determine processing parameters such as temperature, applied vacuum, and pressurization. Once a particular resin composition is chosen to be used, each of these parameters may be identified by suitable experimentation.

While the invention has been described in terms of its preferred embodiments, it should be understood that numerous modifications may be made thereto without departing from the spirit and scope of the invention as defined in the appended claims. It is intended that all such modifications fall within the appended claims.

We claim:

1. A process for producing a castable thermosetting resin comprising the steps:
   (a) formulating a mixture of liquid unsaturated thermosetting resin, including cross-linking monomer, a filler and catalyst to form a blend;
   (b) subjecting said blend to a vacuum and concurrent shearing so as to deaerate said blend of entrapped air bubbles; and
   (c) subjecting said deaerated blend to a pressurization above atmospheric pressure for a time sufficient to cause reincorporation of monomer devolved during said vacuum and shearing step to form a matrix capable of setting and curing in a non-porous machinable casting.

2. A process in accordance with claim 1, wherein said pressurization is approximately at least 1.7 atmospheres.

3. A process in accordance with claim 2, wherein said time is at least five minutes.

4. A process in accordance with claim 1 further comprising subjecting said deaerated blend to vibration.

5. A process in accordance with claim 1, wherein the temperature of the blend during at least the pressurization is controlled to be in the range from 80° to 110° F.

6. A process in accordance with claim 1, wherein said vacuum is in excess of 15 inches of mercury.

7. A process in accordance with claim 1, wherein said filler has particles of a size range which remain in a uniform suspension when subjected to said pressurization but which will not remain in a uniform suspension if said blend is subjected to vibration sufficient to cause reincorporation of volatilized monomer.

8. A process in accordance with claim 7, wherein said pressurization is approximately at least 1.7 atmospheres.

9. A process in accordance with claim 8, wherein said time is at least five minutes.

10. A process in accordance with claim 7, further comprising subjecting said deaerated blend to vibration.

11. A process in accordance with claim 7, wherein the temperature of the blend during at least the pressurization is controlled to be in the range from 80° to 110° F.

12. A process in accordance with claim 7, wherein said vacuum is in excess of 15 inches of mercury.

13. A process in accordance with claim 1, further comprising subjecting said blend to vibration while said shearing is being performed.

14. A process in accordance with claim 13, wherein said pressurization is approximately at least 1.7 atmospheres.

15. A process in accordance with claim 14, wherein said time is at least five minutes.

16. A process in accordance with claim 13, further comprising subjecting said deaerated blend to vibration.

17. A process in accordance with claim 13, wherein the temperature of the blend during at least the pressurization is controlled to be in the range from 80° to 110° F.

18. A process in accordance with claim 13, wherein said vacuum is in excess of 15 inches of mercury.

19. A process in accordance with claim 1, wherein said thermosetting resin is an unsaturated polyester and said filler is alumina trihydrate.

20. A process in acccordance with claim 19, wherein said polyester resin is approximately 20 to 40 weight percentage of said blend and said filler is approximately 60 to 80 weight percentage of said blend.

21. A process for producing a castable thermosetting resin within a mixing apparatus having a mixing zone for mixing the resin to form a uniform blend which is serially connected to a deaeration zone for deaerating the blend which is serially connected to a pressurization zone for pressurizing the blend to reincorporate volatilized monomer back into the blend comprising:
   (a) formulating a mixture of liquid unsaturated thermosetting resin including a filler, cross-linking monomer and catalyst to form a uniform blend within the mixing zone;
   (b) transporting said uniform blend to the deaeration zone where vacuum and shearing of a magnitude sufficient to deaerate said blend is applied to said blend to deaerate said blend of entrapped air bubbles while said blend is transported through said deaeration zone; and
   (c) transporting said deaerated blend to the pressurization zone where pressurization is applied to said deaerated blend while passing through said pressurization zone of a magnitude sufficient to cause reincorporation of monomer volatilized during processing in said deaeration zone to form a matrix capable of setting and curing to form a non-porous machinable casting.

22. A process in accordance with claim 21, wherein the temperature of the blend in at least the pressurization zone is maintained within a range between 80° to 110° F.

23. A process in accordance with claim 21, wherein said vacuum is in excess of 15 inches mercury.

24. A process in accordance with claim 22, wherein said vacuum is in excess of 15 inches mercury.

25. A process in accordance with claim 21, wherein said filler has particles of a size range which remain in a uniform suspension when subjected to said pressurization but which will not remain in a uniform suspension if said blend is subjected to vibration sufficient to cause reincorporation of volatilized monomer.

26. A process in accordance with claim 21, wherein said filler is alumina trihydrate and said resin is an unsaturated polyester resin which is approximately 20 to 40 weight percentage of said uniform blend and said filler is approximately 60 to 80 weight percentage of the uniform blend.

27. A process in accordance with claim 21, wherein said mixing apparatus is comprised of a barrel and a screw with said screw extending through said three zones.

28. A product made in accordance with the process of claim 1.

29. A product made in accordance with the process of claim 7.

30. A product made in accordance with the process of claim 10.

31. A product made in accordance with the process of claim 13.

32. A product made in accordance with the process of claim 20.

33. A product made in accordance with the process of claim 21.

34. A product made in accordance with the process of claim 22.

35. A product made in accordance with the process of claim 26.

36. A process for producing a castable unsaturated thermosetting resin within a mixing apparatus having a mixing zone for mixing the resin to form a uniform blend which is continuously transported during mixing to a connected deaeration zone for deaerating the blend comprising:
   (a) formulating a uniform mixture of liquid thermosetting resin, including, a filler, cross-linking monomer and catalyst to form a blend while being transported throughout the mixing zone;
   (b) subjecting said blend to a vacuum and concurrent shearing to remove entrapped air bubbles while said blend is transported through said deaeration zone so as to form a deaerated blend; and
   (c) subjecting said deaerated blend to vibration for a time sufficient to cause reincorporation of monomer devolved during said vacuum and shearing step to form a matrix capable of setting and curing in a non-porous machinable casting.

37. A process in accordance with claim 36 wherein said resin is polyester.

38. A process in accordance with claim 36 wherein the deaerated blend is placed in a mold where said vibration is applied.

39. A process for producing a castable thermosetting resin comprising the steps:
   (a) formulating a mixture of liquid unsaturated thermosetting resin, including a cross-linking monomer and a catalyst to form a blend;
   (b) subjecting said blend to a vacuum and concurrent shearing so as to deaerate said blend of entrapped air bubbles; and
   (c) subjecting said deaerated blend to a pressurization above atmospheric pressure for a time sufficient to cause reincorporation of monomer volatilized during said vacuum and shearing step to form a matrix capable of setting and curing in a non-porous machinable casting.

40. A process for producing a castable unsaturated thermosetting resin within a mixing apparatus having a zone for mixing the resin to form a blend and for deaerating the blend comprising:
   (a) formulating a uniform mixture of liquid unsaturated thermosetting resin, including cross-linked monomer and catalyst to form said blend;
   (b) subjecting said blend to a vacuum and concurrent shearing so as to deaerate said blend of entrapped air bubbles; and
   (c) subjecting said deaerated blend to vibration for a time sufficient to cause reincorporation of monomer devolved during said vacuum and shearing step to form a matrix capable of setting and curing in a non-porous machinable casting.

41. A process for producing a castable thermosetting resin comprising the steps:
   (a) formulating a mixture of liquid unsaturated thermosetting resin, including cross-linking monomer, a filler and catalyst to form a blend;
   (b) subjecting said blend to venting and concurrent shearing so as to deaerate said blend of entrapped air bubbles; and
   (c) subjecting said deaerated blend to a pressurization above atmospheric pressure for a time sufficient to cause reincorporation of monomer devolved during said vacuum and shearing step to form a matrix capable of setting and curing in a non-porous machinable casting.

42. A process for producing a castable thermosetting resin within a mixing apparatus having a mixing zone for mixing the resin to form a uniform blend which is serially connected to a deaeration zone for deaerating the blend which is serially connected to a pressurization zone for pressurizing the blend to reincorporate volatilized monomer back into the blend comprising:
   (a) formulating a mixture of liquid unsaturated thermosetting resin including cross-linking monomer, and catalyst to form a uniform blend within the mixing zone;
   (b) transporting said uniform blend to the deaeration zone where vacuum and shearing of a magnitude sufficient to deaerate said blend is applied to said blend to deaerate said blend of entrapped air bubbles while said blend is transported through said deaeration zone; and
   (c) transporting said deaerated blend to the pressurization zone where pressurization is applied to said deaerated blend while passing through said pressurization zone of a magnitude sufficient to cause reincorporation of monomer volatilized during processing in said deaeration zone to form a matrix capable of setting and curing to form a non-porous machinable casting.

43. A process for producing a castable unsaturated thermosetting resin within a mixing apparatus having a mixing zone for mixing the resin to form a uniform blend which is continuously transported during mixing to a connected deaeration zone for deaerating the blend comprising:
   (a) formulating a uniform mixture of liquid thermosetting resin, including cross-linking monomer and catalyst to form a blend while being transported through the mixing zone;
   (b) subjecting said blend to a vacuum and concurrent shearing to remove entrapped air bubbles while said blend is transported through said deaeration zone so as to form a deaerated blend; and
   (c) subjecting said deaerated blend to vibration for a time sufficient to cause reincorporation of monomer devolved during said vacuum and shearing step to form a matrix capable of setting and curing in a non-porous machinable casting.

44. A process in accordance with claim 40 wherein said blend contains a filler.

* * * * *